US010639821B2

(12) United States Patent
Jing et al.

(10) Patent No.: US 10,639,821 B2
(45) Date of Patent: May 5, 2020

(54) ULTRAVIOLET CURING DEVICE, SEALANT CURING SYSTEM AND SEALANT CURING METHOD

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Yangkun Jing, Beijing (CN); Xiaopan Che, Beijing (CN); Zhiwei Xu, Beijing (CN); Qin Liu, Beijing (CN); Aicui Zuo, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 769 days.

(21) Appl. No.: 15/291,361

(22) Filed: Oct. 12, 2016

(65) Prior Publication Data

US 2017/0191754 A1 Jul. 6, 2017

(30) Foreign Application Priority Data

Jan. 4, 2016 (CN) .......................... 2016 1 0004181

(51) Int. Cl.
*B29C 35/08* (2006.01)
*G02F 1/13* (2006.01)
(Continued)

(52) U.S. Cl.
CPC ............ *B29C 35/0805* (2013.01); *F26B 3/28* (2013.01); *F26B 3/347* (2013.01); *G02F 1/1303* (2013.01);
(Continued)

(58) Field of Classification Search
None
See application file for complete search history.

(56) References Cited

U.S. PATENT DOCUMENTS 5,020,881 A * 6/1991 Matsuda ............... G02F 1/1354
349/24
5,589,955 A * 12/1996 Amako ................ G03H 1/0005
359/10
(Continued)

FOREIGN PATENT DOCUMENTS

CN 1437050 A 8/2003
CN 201063917 Y 5/2008
(Continued)

OTHER PUBLICATIONS

First Office Action for Chinese Application No. 201610004181.4, dated Apr. 16, 2018, 14 Pages.

*Primary Examiner* — Benjamin A Schiffman
(74) *Attorney, Agent, or Firm* — Brooks Kushman P.C.

(57) ABSTRACT

The present disclosure provides a UV curing device, a sealant curing system and a sealant curing method. The UV curing device includes: a light-emitting mechanism configured to emit and guide UV rays in an output direction; and a first adjustment mechanism connected to the light-emitting mechanism and configured to adjust the output direction of the UV rays from the light-emitting mechanism so that the UV rays enter a to-be-cured display panel at an incident angle.

20 Claims, 7 Drawing Sheets

(51) Int. Cl.
*F26B 3/28* (2006.01)
*F26B 3/347* (2006.01)
*G02F 1/1339* (2006.01)
*B29C 35/02* (2006.01)
*B29L 31/34* (2006.01)

(52) U.S. Cl.
CPC ........ *G02F 1/1339* (2013.01); *B29C 35/0288* (2013.01); *B29C 2035/0827* (2013.01); *B29L 2031/3475* (2013.01)

(56) References Cited

U.S. PATENT DOCUMENTS

| | | | |
|---|---|---|---|
| 5,934,780 A * | 8/1999 | Tanaka | G02B 5/3066 362/19 |
| 6,206,527 B1 * | 3/2001 | Suzuki | G02B 7/24 359/856 |
| 6,295,110 B1 * | 9/2001 | Ohe | G02F 1/133788 349/124 |
| 6,874,899 B2 * | 4/2005 | Leidig | G02F 1/133634 349/124 |
| 7,349,050 B2 * | 3/2008 | Park | G02F 1/1339 349/124 |
| 2003/0147032 A1 | 8/2003 | Park et al. | |
| 2008/0068716 A1 | 3/2008 | Goto | |
| 2011/0127697 A1 * | 6/2011 | Milne | B23K 26/046 264/400 |
| 2013/0062538 A1 | 3/2013 | Kodama et al. | |
| 2014/0064053 A1 * | 3/2014 | Tsuyama | C07C 255/56 369/100 |

FOREIGN PATENT DOCUMENTS

| | | |
|---|---|---|
| CN | 101697040 A | 4/2010 |
| CN | 202129204 U | 2/2012 |
| JP | 2005043700 A | 2/2005 |

* cited by examiner

ULTRAVIOLET CURING DEVICE, SEALANT CURING SYSTEM AND SEALANT CURING METHOD

CROSS-REFERENCE TO RELATED APPLICATIONS

This application claims priority to Chinese Patent Application No. 201610004181.4 filed on Jan. 4, 2016, the disclosure of which is incorporated in its entirety by reference herein.

TECHNICAL FIELD

The present disclosure relates to the field of sealant curing technology, in particular to an ultraviolet (UV) curing device, a sealant curing system and a sealant curing method.

BACKGROUND

A cell formation process for a liquid crystal display panel includes steps of: applying a sealant onto a periphery of a substrate with a sealant applicator; filling liquid crystals at a center of another substrate through One Drop Fill (ODF); adhering the two substrates in a vacuum, i.e., performing the cell formation; and curing the sealant. To be specific, the sealant is irradiated by UV rays for a short period of time so as to be cured partially, then the sealant is placed into a UV curing chamber to further cure a photosensitive component in the sealant, and then the uncured sealant is completely cured in a high-temperature furnace, so as to complete the entire cell formation process.

However, during the curing procure of the sealant, parts of the UV rays may be shielded by some elements on the substrate, e.g., a black matrix or a wire. At this point, the sealant at a region where the UV rays are shielded cannot be irradiated, so a curing effect of the sealant will be adversely affected.

SUMMARY

An object of the present disclosure is to provide a UV curing device, a sealant curing system and a sealant curing method, so as to improve a curing effect.

In one aspect, the present disclosure provides in some embodiments a UV curing device, including: a light-emitting mechanism configured to emit and guide UV rays in an output direction; and a first adjustment mechanism connected to the light-emitting mechanism and configured to adjust the output direction of the UV rays from the light-emitting mechanism so that the UV rays enter a to-be-cured display panel at an incident angle.

Optionally, the light-emitting mechanism includes: a UV source; and an optical assembly configured to treat the UV rays from the UV source and guide the treated UV rays in the output direction. The first adjustment mechanism is configured to adjust an emission angle of the UV rays from the UV source and/or positions of optical elements in the optical assembly, so as to adjust the output direction of the UV rays from the optical assembly.

Optionally, the UV source is a UV laser, and the optical assembly includes a scattering sub-assembly and a guiding sub-assembly. The scattering sub-assembly is configured to scatter the UV rays from the UV laser, and the scattered UV rays are guided by the guiding sub-assembly.

Optionally, the scattering sub-assembly includes a plano-convex collimating lens, and the guiding sub-assembly includes a plane mirror and a plano-convex focusing lens. The plano-convex collimating lens is configured to receive the UV rays from the UV laser and output collimated parallel UV rays. The collimated parallel UV rays are reflected by the plane mirror and enter the plano-convex focusing lens. The plano-convex focusing lens is configured to focus the UV rays reflected by the plane mirror and output the focused UV rays.

Optionally, the UV rays from the plano-convex focusing lens enters the to-be-cured display panel in such a manner as to form a circular light spot with a diameter not greater than a width of a sealant on the to-be-cured display panel.

Optionally, the UV laser is located at a focus of the plano-convex collimating lens, the plano-convex collimating lens is located between the UV laser and the plane mirror, an optical axis of the plano-convex collimating lens has an angle of 45° relative to a surface of the plane mirror, an optical axis of the plano-convex focusing lens has an angle of 45° relative to the surface of the plane mirror, and the optical axis of the plano-convex collimating lens is perpendicular to the optical axis of the plano-convex focusing lens.

Optionally, the UV source is an extra-high-pressure mercury vapor lamp. The optical assembly includes a collecting lens, a first plane mirror, a condensing and reflecting mirror, a second plane mirror, and a UV-diffusion combination transparent plate. The UV rays from the extra-high-pressure mercury vapor lamp are collected by the collecting lens toward the first plane mirror, then reflected by the first plane mirror toward the condenser mirror, then reflected by the condenser mirror toward the second plane mirror, and then reflected by the second plane mirror toward the UV-diffusion combination transparent plate. The UV-diffusion combination transparent plate is configured to diffuse the UV rays reflected by the second plane mirror, and output the diffused UV rays in the output direction.

Optionally, the collecting lens is sleeved onto the extra-high-pressure mercury vapor lamp, so as to collect the UV rays from the extra-high-pressure mercury vapor lamp toward the first plane mirror, the first plane mirror is arranged opposite to the condenser mirror, and the second plane mirror is arranged parallel to a surface of the first plane mirror.

Optionally, the optical assembly further includes a shutter arranged between the first plane mirror and the condenser mirror.

Optionally, the optical assembly further includes a filter arranged between the shutter and the condenser mirror, and configured to filter out rays other than the UV rays.

Optionally, the UV-diffusion combination transparent plate includes a diffusion plate, a first prism set and a second prism set arranged sequentially. The first prism set includes a plurality of prisms arranged parallel to each other and extending in a first direction, and the second prism set includes a plurality of prisms arranged parallel to each other and extending in a second direction perpendicular to the first direction.

Optionally, a light-exiting surface of the second prism set is provided with a vacuum slot, which is connected to a vacuum pipe and a vacuumizing unit and which is configured to adsorb a UV mask plate in the case that it is vacuumized.

Optionally, the UV curing device further includes an illuminometer arranged on the second plane mirror and configured to measure an intensity of the UV rays from the optical assembly.

In another aspect, the present disclosure provides in some embodiments a sealant curing system, including: a support table configured to support and fix thereon a to-be-cured display panel; and a curing module arranged above the support table and configured to cure a sealant on the to-be-cured display panel. The curing module includes the above-mentioned UV curing device as a first UV curing device.

Optionally, the curing module further includes: a second UV curing device configured to cure the sealant on the to-be-cured display panel, a light spot formed by UV rays from the second UV curing device on the to-be-cured display panel having an area larger than the light spot formed by the UV rays from the first UV curing device; and a control device connected to the first UV curing device and the second UV curing device, and configured to control the second UV curing device to initially irradiate the sealant on the to-be-cured display panel, and after the completion of the initial irradiation, control the first UV curing device to additionally irradiate the sealant at a position where the sealant is not completely cured on the to-be-cured display panel.

Optionally, the second UV curing device includes: a UV source; an optical assembly configured to treat UV rays from the UV source and guide the treated UV rays in an output direction; and a second adjustment mechanism configured to adjust an emission angle of the UV rays from the UV source of the second UV curing device and/or positions of optical elements in the optical assembly, so as to adjust the output direction of the UV rays from the optical assembly.

Optionally, the sealant curing system further includes a first reflection plate arranged on the support table, with a reflection surface facing the UV curing device.

Optionally, the sealant curing system further includes a second reflection plate arranged above the curing module, with a reflection surface facing the curing module.

In yet another aspect, the present disclosure provides in some embodiments a sealant curing method for curing a sealant on a to-be-cured display panel using the above-mentioned sealant curing system, including an adjustment step of, in the case that the to-be-cured display panel is irradiated by the first UV curing device, adjusting an emission angle of UV rays from the UV source of the first UV curing device and/or a position of the optical assembly, so as to enable the optical assembly to output the UV rays at an incident angle toward the to-be-cured display panel.

Optionally, the sealant curing system further includes a second UV curing device configured to cure the sealant on the to-be-cured display panel. Prior to the adjustment step, the method further includes controlling the second UV curing device to initially irradiate the sealant on the to-be-cured display panel.

Optionally, the method includes steps of: controlling UV rays from the curing module; detecting an intensity of the UV rays from the curing module, and determining whether or not the intensity is less than a first value; in the case that the detected intensity is less than the first value, adjusting the intensity of the UV rays from the curing module; in the case that the detected intensity is not less than the first value, irradiating the to-be-cured display panel with the UV rays; accumulating illumination values of the UV rays irradiating the to-be-cured display panel to obtain an accumulated illumination value, and determining whether or not the accumulated illumination value reaches a second value; and in the case that the accumulated illuminated value reaches the second value, terminating the irradiation at a current position, and otherwise, continuing to irradiate the to-be-cured display panel at the current position.

According to the embodiments of the present disclosure, the UV curing device is provided with the adjustment mechanism, so as to adjust the output direction of the UV rays from the light-emitting mechanism according to the practical need. Hence, apart from irradiating the sealant perpendicularly, the light-emitting mechanism may also emit the UV rays to irradiate the sealant at an incident angle, so as to irradiate the sealant at a region of the display panel, e.g., to irradiate the sealant shielded by a pattern on the display panel. As a result, it is able to improve a curing effect of the sealant.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure will be described hereinafter in conjunction with the drawings and embodiments. The following embodiments are for illustrative purposes only, but shall not be used to limit the scope of the present disclosure.

Figure 1:
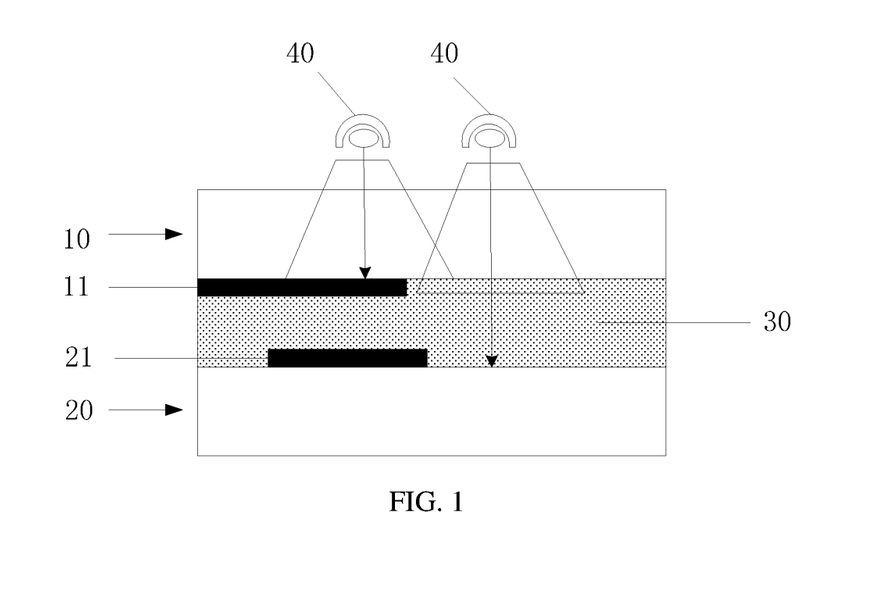
FIG. 1 is a schematic view showing a situation where a sealant is irradiated by a UV source in the related art.
Figure 2:
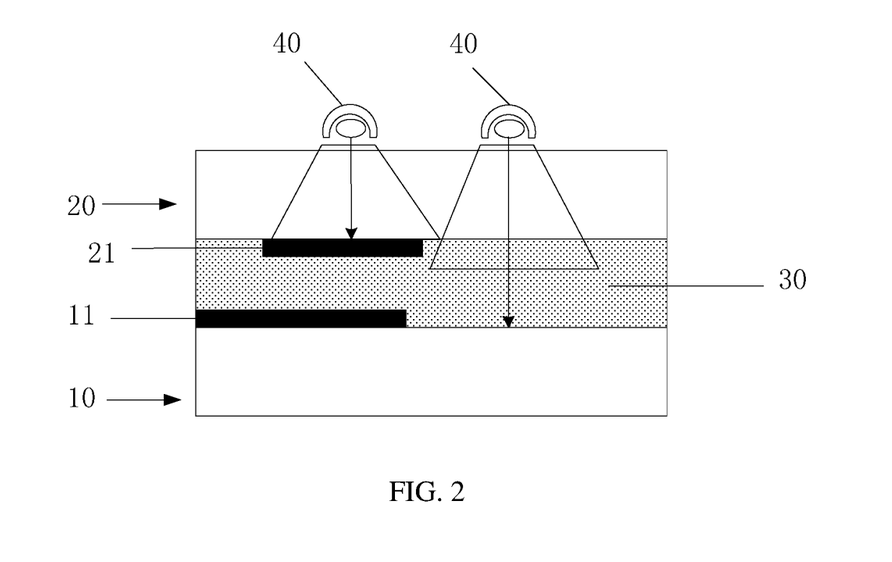
FIG. 2 is another schematic view showing the situation where the sealant is irradiated by the UV source in the related art.

Referring to FIG. 1, which is a schematic view showing a situation where a sealant is irradiated by a UV source in the related art, 10 represents a color filter substrate, 20 represents an array substrate, 30 represents the sealant, 40 represents the UV source, 11 represents a black matrix on the color filter substrate 10, and 21 represents a wire on the array substrate. In the related art, usually the sealant is irradiated by the UV source 40 perpendicularly, and an irradiation angle cannot be adjusted. During the radiation, parts of UV rays may be shielded by the black matrix 11 on the color filter substrate 10, so the sealant at a region where the UV rays are shielded cannot be irradiated. As a result, a curing effect of the sealant will be adversely affected. In addition, in the related art, as shown in FIG. 2, the sealant may also be irradiated by the UV source 40 from a side of the array substrate 20. Similarly, parts of the UV rays may be shielded by the wire 21 on the array substrate 20, and the curing effect will be adversely affected too.

In order to adjust the irradiation angle and improve the curing effect, the present disclosure provides in some embodiments a UV curing device, which includes a light-emitting mechanism and a first adjustment mechanism. The light-emitting mechanism is to emit and guide UV rays in an output direction. The first adjustment mechanism is connected to the light-emitting mechanism and is to adjust the output direction of the UV rays from the light-emitting mechanism so that the UV rays enter a to-be-cured display panel at an incident angle.

According to the embodiments of the present disclosure, the UV curing device is provided with the first adjustment mechanism, so as to adjust the output direction of the UV rays from the light-emitting mechanism according to the practical need. Hence, apart from irradiating the sealant perpendicularly, the light-emitting mechanism may also emit the UV rays to irradiate the sealant at an incident angle, so as to irradiate the sealant at a predetermined region of the display panel, e.g., to irradiate the sealant shielded by a pattern on the display panel. As a result, it is able to improve a curing effect of the sealant.

The light-emitting mechanism may include a UV source, and the first adjustment mechanism may be connected to the UV source, so as to adjust an emission angle of the UV source according to the practical need, thereby to enable the UV rays from the UV source to enter the to-be-cured display panel at the incident angle and irradiate the sealant at a predetermined region.

Figure 3:
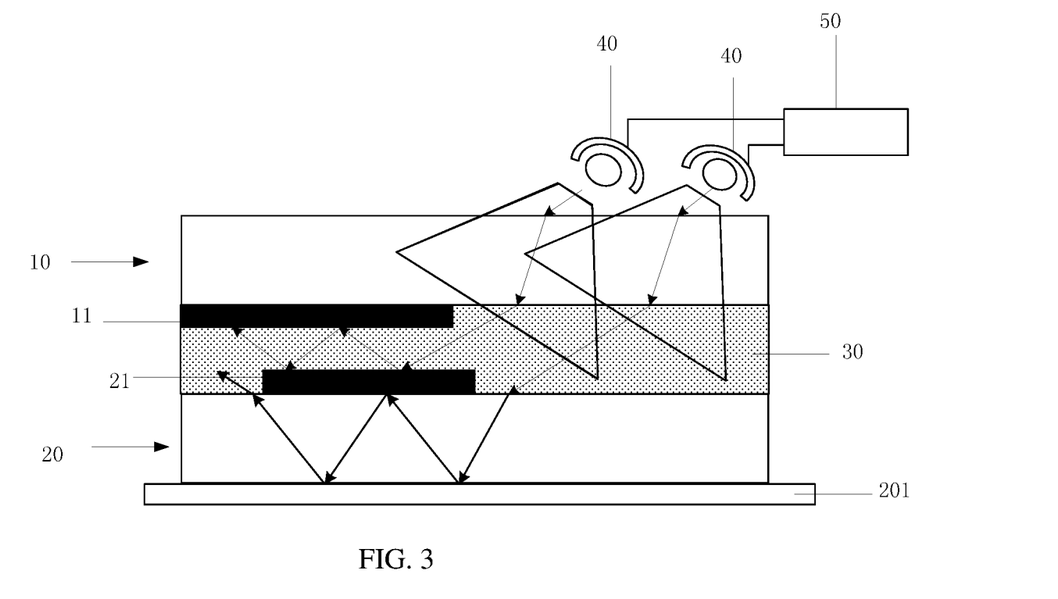
FIG. 3 is a schematic view showing a situation where a sealant is irradiated by a UV curing device according to one embodiment of the present disclosure.
Figure 4:
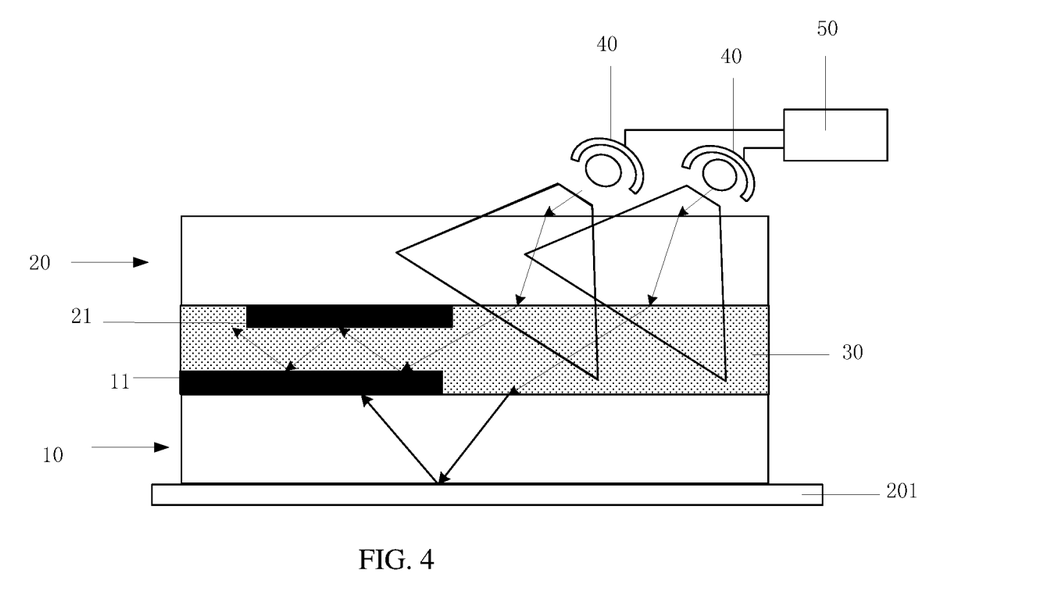
FIG. 4 is another schematic view showing the situation where the sealant is irradiated by the UV curing device according to one embodiment of the present disclosure.

FIG. 3 is a schematic view showing a situation where the sealant is irradiated by the UV curing device according to one embodiment of the present disclosure, and FIG. 4 is another schematic view showing the situation where the sealant is irradiated by the UV curing device according to one embodiment of the present disclosure. In FIG. 3, the sealant is irradiated by the UV source from a side of the color filter substrate 10; and in FIG. 4, the sealant is irradiated by the UV source from a side of the array substrate 20. In FIGS. 3 and 4, the emission angle of the UV rays from the UV source 40 may be adjusted by the first adjustment mechanism 50, so as to enable the UV rays from the UV source 40 to enter the display panel at the predetermined incident angle (not perpendicularly). At this point, the UV rays may be reflected by a pattern on the display panel (e.g., by the wire 21 on the array substrate 20 and the black matrix 11 on the color filter substrate 10), so as to diffuse the UV rays in the display panel and enable the UV rays to enter some regions shielded by the pattern, thereby to irradiate the sealant at these regions. In FIGS. 3 and 4, 201 represents a reflection plate, which is to improve a utilization rate of the UV rays.

In the related art, the UV source is usually a point light source, e.g., a UV laser or an extra-high-pressure mercury vapor lamp. Hence, it needs to corporate with an optical assembly, so as to provide an area light source with a desired shape. In some embodiments of the present disclosure, the light-emitting mechanism may include: a UV source; and an optical assembly configured to treat the UV rays from the UV source and guide the treated UV rays in the output direction. The first adjustment mechanism is to adjust an emission angle of the UV rays from the UV source and/or positions of optical elements in the optical assembly, so as to adjust the output direction of the UV rays from the optical assembly.

According to the embodiments of the present disclosure, the UV curing device is provided with the first adjustment mechanism, so as to adjust the emission angle of the UV rays from the light-emitting mechanism, or adjust positions of optical elements in the optical assembly, or adjust both the emission angle and the positions of the optical elements. Hence, apart from irradiating the sealant perpendicularly, the light-emitting mechanism may also emit the UV rays to irradiate the sealant at a predetermined angle, so as to irradiate the sealant at a predetermined region of the display panel, e.g., to irradiate the sealant shielded by the pattern on the display panel. As a result, it is able to improve a curing effect of the sealant.

In some embodiments of the present disclosure, the UV source may be a UV laser, the optical assembly may include a scattering sub-assembly and a guiding sub-assembly. The scattering sub-assembly is to scatter the UV rays from the UV laser, and the scattered UV rays are guided by the guiding sub-assembly.

Figure 5:
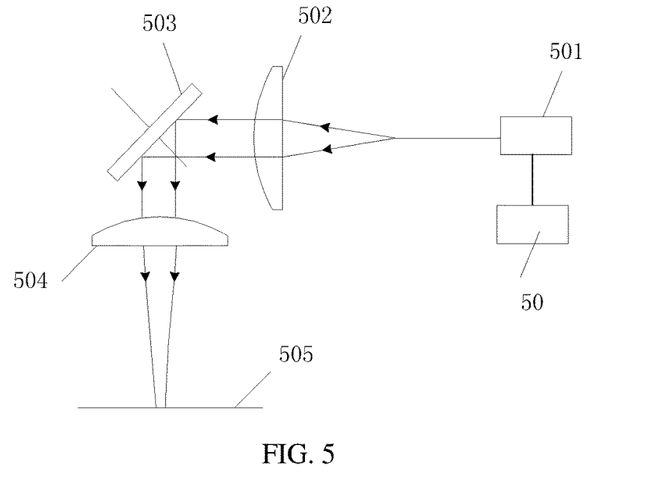
FIG. 5 is a schematic view of a UV curing device according to one embodiment of the present disclosure.

Referring to FIG. 5, which is a schematic view showing the UV curing device according to one embodiment of the present disclosure, the UV curing device includes a light-emitting mechanism and a first adjustment mechanism 50. The light-emitting mechanism includes a UV laser 501 and an optical assembly. The optical includes a scattering sub-assembly and a guiding sub-assembly. The scattering sub-assembly includes a plano-convex collimating lens 502. The guiding sub-assembly includes a plane mirror 503 and a plano-convex focusing lens 504. The plano-convex collimating lens 502 is to receive the UV rays from the UV laser 501 and output collimated parallel UV rays. The collimated parallel UV rays are reflected by the plane mirror 503 and enter the plano-convex focusing lens 504. The plano-convex focusing lens 504 is to focus the UV rays reflected by the plane mirror 503 and output the focused UV rays toward the to-be-cured display panel.

In the embodiments of the present disclosure, the UV laser 501 is located at a focus of the plano-convex collimating lens 502. The plano-convex collimating lens 502 is located between the UV laser 501 and the plane mirror 503. An optical axis of the plano-convex collimating lens 502 has an angle of 45° relative to a surface of the plane mirror 503. An optical axis of the plano-convex focusing lens 504 has an angle of 45° relative to the surface of the plane mirror 503. The optical axis of the plano-convex collimating lens 502 is perpendicular to the optical axis of the plano-convex focusing lens 504.

Optionally, the UV rays from the plano-convex focusing lens 504 enters the to-be-cured display panel in such a manner as to form a circular light spot with a diameter not greater than a width of the sealant on the to-be-cured display panel. In this way, when the sealant is irradiated by UV rays from the light-emitting mechanism, it is able to prevent the UV rays from irradiating a region beyond the sealant, i.e., from damaging liquid crystals. Optionally, the diameter of the circular light spot is equal to the width of the sealant, so as to improve the curing efficiency.

In the embodiments of the present disclosure, a focus length of the plano-convex focusing lens 504 may be adjusted, so as to adjust an area of the light spot.

Optionally, the UV laser 501 has an output wavelength of 365 nm.

In the embodiments of the present disclosure, the first adjustment mechanism 50 is connected to the UV laser 501, so as to adjust an emission angle of the UV rays from the UV laser 501, thereby to enable the UV rays to irradiate, at a predetermined angle, the sealant at a predetermined region.

Of course, in some other embodiments of the present disclosure, the first adjustment mechanism 50 may also be connected to the optical assembly, so as to adjust positions of one or more optical elements in the optical assembly, thereby to enable the UV rays to irradiate, at a predetermined angle, the sealant at a predetermined region.

Optionally, in some other embodiments of the present disclosure, the first adjustment mechanism 50 may be connected to both the UV laser 501 and the optical assembly, so as to adjust the emission angel of the UV rays from the UV laser 501 and the positions of one or more optical elements in the optical assembly, thereby to enable the UV rays to irradiate, at a predetermined angle, the sealant at a predetermined region.

Figure 6:
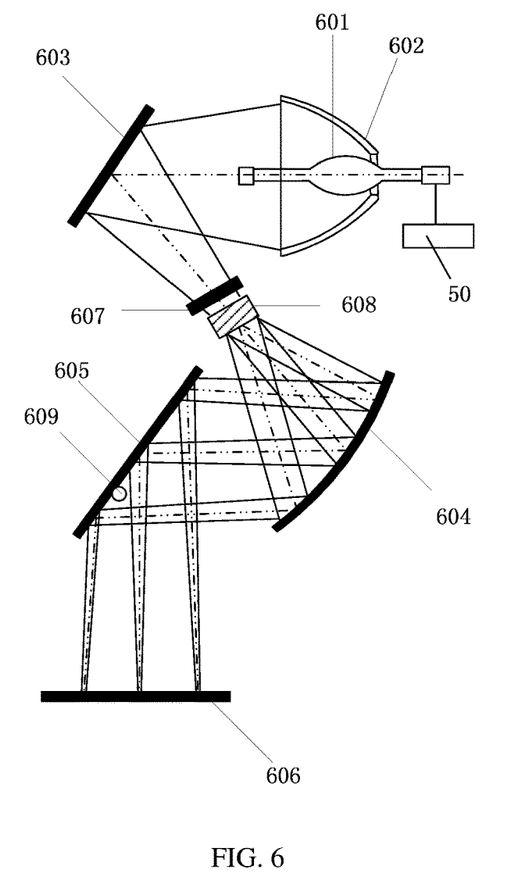
FIG. 6 is another schematic view of a UV curing device according to one embodiment of the present disclosure.

Referring to FIG. 6, which is a schematic view of a UV curing device according to one embodiment of the present disclosure, the UV curing device includes a light-emitting mechanism and the first adjustment mechanism 50. The light-emitting mechanism includes a UV source and an optical assembly. The UV source is an extra-high-pressure mercury vapor lamp 601. The optical assembly includes a collecting lens 602, a first plane mirror 603, a condensing and reflecting mirror 604, a second plane mirror 605, and a UV-diffusion combination transparent plate 606. The UV rays from the extra-high-pressure mercury vapor lamp 601 are collected by the collecting lens 602 toward the first plane mirror 603, then reflected by the first plane mirror 603 toward the condenser mirror 604, then reflected by the condenser mirror 604 toward the second plane mirror 605, and then reflected by the second plane mirror 605 toward the UV-diffusion combination transparent plate 606. The UV-diffusion combination transparent plate 606 is configured to diffuse the UV rays reflected by the second plane mirror 605, and output the diffused UV rays in the output direction.

In this embodiment, the collecting lens 602 is sleeved onto the extra-high-pressure mercury vapor lamp 601, so as to collect the UV rays from the extra-high-pressure mercury vapor lamp 601 toward the first plane mirror 603. The first plane mirror 603 is arranged opposite to the condenser mirror 604. The second plane mirror 605 is arranged parallel to a surface of the first plane mirror 603.

When the sealant at different positions is irradiated by the light-emitting mechanism, the light-emitting mechanism may be turned off and moved to a next position after the sealant at one certain position has been cured. To be specific, an on or off state of the extra-high-pressure mercury vapor lamp 601 may be controlled, so as to enable the light-emitting mechanism to, or not to, output the UV rays. However, in the case that the extra-high-pressure mercury vapor lamp 601 is frequently turned on and off, its service life will be adversely affected. In the embodiments of the present disclosure, the optical assembly may further include a shutter 607, through which the light-emitting mechanism may be controlled to output, or not to output, the UV rays. Referring to FIG. 6, the shutter 607 is arranged between the first plane mirror 603 and the condensing and reflecting mirror 604. In the case that the shutter 607 is closed, it may shield the UV rays reflected by the first plane mirror 603 toward the condensing and reflecting mirror 604. In the case that the shutter 607 is opened, the UV rays reflected by the first plane mirror 603 may pass through the shutter 607 and reach the condensing and reflecting mirror 604. Of course, in some other embodiments of the present disclosure, the shutter 607 may be arranged at any other positions.

The extra-high-pressure mercury vapor lamp in the related art may generate invalid rays, e.g., visible rays and infrared rays, which may adversely affect the curing effect of the sealant. In the embodiments of the present disclosure, the optical assembly may further include a filter 608 arranged between the shutter 607 and the condenser mirror 604, and configured to filter out rays other than the UV rays. Of course, in some other embodiments of the present disclosure, the filter 608 may be arranged at any other positions.

Referring to FIG. 6, the UV curing device may further include an illuminometer 609 arranged on the second plane mirror 605 and configured to measure an intensity of the UV rays from the optical assembly. Of course, the illuminometer 609 may also be arranged at any other positions.

Figure 7:
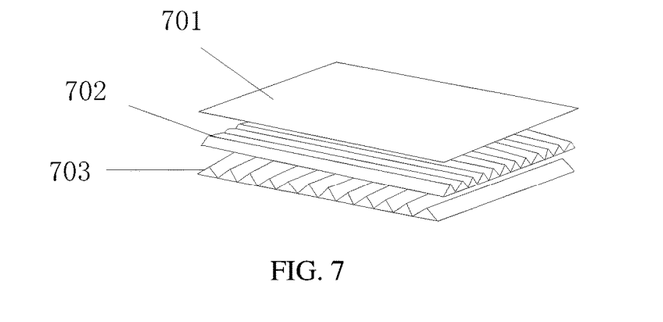
FIG. 7 is a schematic view of a UV-diffusion combination transparent plate according to one embodiment of the present disclosure.

Referring to FIG. 7, which is a schematic view showing the UV-diffusion combination transparent plate according to one embodiment of the present disclosure, the UV-diffusion combination transparent plate includes a diffusion plate 701, a first prism set 702 and a second prism set 703 arranged sequentially. The first prism set 702 includes a plurality of prisms arranged parallel to each other and extending in a first direction. The second prism set 703 includes a plurality of prisms arranged parallel to each other and extending in a second direction perpendicular to the first direction. The first prism set 702 and the second prism set 703 may be made of low emissivity glass, which is transparent while having low reflectivity with respect to near-infrared radiation and high reflectivity with respect to far-infrared radiation.

Figure 12:
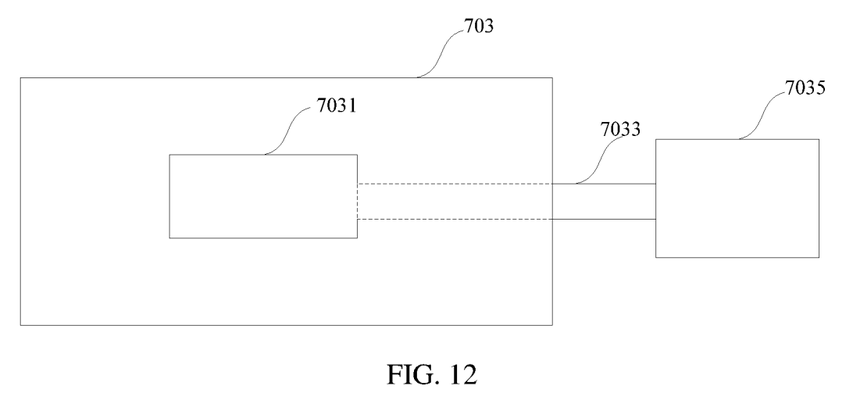
FIG. 12 is a schematic view showing a situation where a second prism set in the UV-diffusion combination transparent plate is connected to a vacuumizing unit according to one embodiment of the present disclosure.

Optionally, as shown in FIG. 12, a light-exiting surface of the second prism set 703 is provided with a vacuum slot 7031, which is connected to a vacuum pipe 7033 and a vacuumizing unit 7035. The vacuum slot 7031 is configured to adsorb a UV mask plate in the case that it is vacuumized. In this way, it is unnecessary to provide a specific member to adsorb the UV mask plate, thereby to reduce the production cost and save the room.

In the embodiments of the present disclosure, the first adjustment mechanism 50 is connected to the extra-high-pressure mercury vapor lamp 601, so as to adjust the emission angle of the UV rays from the extra-high-pressure mercury vapor lamp 601, thereby to enable the UV rays to irradiate, at the predetermined angle, the sealant at the predetermined region.

Of course, in some other embodiments, the first adjustment mechanism 50 may also be connected to the optical assembly, so as to adjust positions of one or more optical elements in the optical assembly, thereby to enable the UV rays to irradiate, at a predetermined angle, the sealant at a predetermined region.

Optionally, in some other embodiments of the present disclosure, the first adjustment mechanism 50 may be connected to both the UV laser 501 and the optical assembly, so as to adjust the emission angel of the UV rays from the UV laser 501 and the positions of one or more optical elements in the optical assembly, thereby to enable the UV rays to irradiate, at a predetermined angle, the sealant at a predetermined region.

Optionally, an irradiation region formed by the UV rays from the light-emitting mechanism may have a diameter smaller than the width of the sealant on the to-be-cured display panel, and the UV curing device may be moved on a surface of the to-be-cured display panel so as to irradiate the sealant thereon. Fewer UV lasers or extra-high-pressure mercury vapor lamps may be provided in the case that a smaller irradiation region is formed by the UV rays from the light-emitting mechanism, so as to reduce the production cost and the power consumption.

The present disclosure further provides in some embodiments a sealant curing system, which includes: a support table configured to support and fix thereon the to-be-cured display panel; and a curing module arranged above the support table and configured to cure the sealant on the to-be-cured display panel. The curing module includes the above-mentioned UV curing device as a first UV curing device.

In the case of curing the sealant on the to-be-cured display panel, usually the sealant at a large region may be irradiated initially using a UV curing device (large-area irradiation), and then the sealant at a predetermined region, which is not irradiated during the initial irradiation, may be irradiated additionally using another UV curing device (small-area radiation). In the embodiments of the present disclosure, the first UV curing device usually refers to that for additional irradiation.

In addition, the curing module may further include: a second UV curing device configured to cure the sealant on the to-be-cured display panel, a light spot formed by UV rays from the second UV curing device on the to-be-cured display panel having an area larger than the light spot formed by the UV rays from the first UV curing device; and a control device connected to the first UV curing device and the second UV curing device, and configured to control the second UV curing device to initially irradiate the sealant on the to-be-cured display panel, and after the completion of the initial irradiation, control the first UV curing device to additionally irradiate the sealant at a predetermined position where the sealant is not completely cured on the to-be-cured display panel.

In the related art, usually the second UV curing device for the initial irradiation is also used to irradiate the to-be-cured display panel perpendicularly. At this point, there may exist a blind region where the sealant is not irradiated by the UV rays. In the embodiments of the present disclosure, the second UV curing device may further include: a UV source; an optical assembly configured to treat UV rays from the UV source and guide the treated UV rays in an output direction; and a second adjustment mechanism configured to adjust an emission angle of the UV rays from the UV source of the second UV curing device and/or positions of optical elements in the optical assembly, so as to adjust the output direction of the UV rays from the optical assembly.

Figure 8:
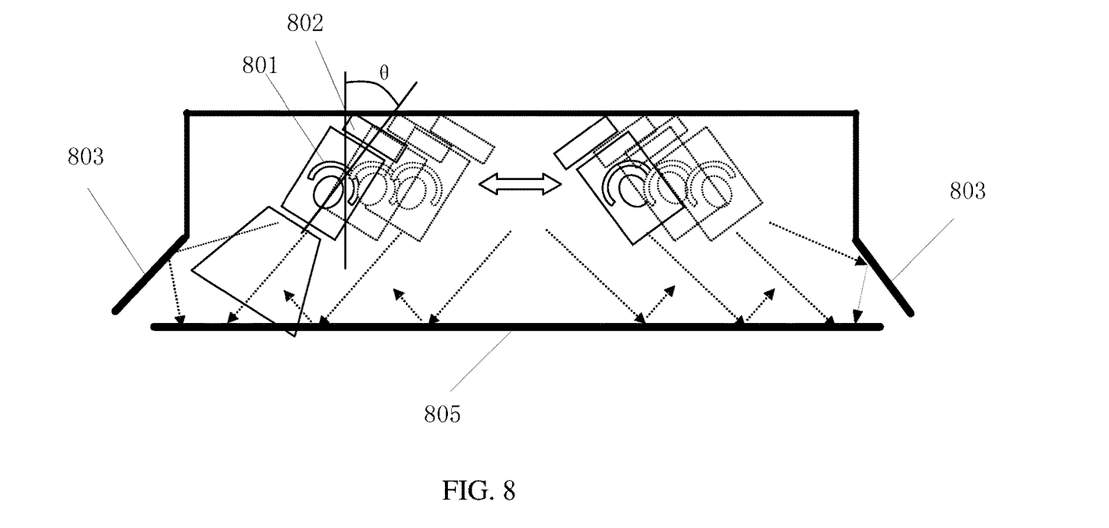
FIG. 8 is a schematic view of a UV curing device for irradiating a region with a large area according to one embodiment of the present disclosure.

Referring to FIG. 8, which is a schematic view showing the UV curing device (i.e., the second UV curing device) for large-area irradiation according to one embodiment of the present disclosure, the second UV curing device includes a UV source 801, an optical assembly and a second adjustment mechanism 802. The second adjustment mechanism 802 is configured to adjust an emission angel of the UV rays from the UV source 801. For example, in FIG. 8, the to-be-cured display panel 805 is irradiated by the UV rays at a predetermined angle θ. In the embodiment of the present disclosure, the second UV curing device further includes a reflection member 803 so as to improve a utilization rate of the UV rays and control the UV rays from the UV sources 801 to irradiate the sealant at a predetermined region.

The emission angle of the UV rays from the UV sources 801 may be adjusted so as to irradiate the sealant at different regions, so the number of the UV sources 801 may be reduced.

In the embodiments of the present disclosure, the emission angels of the UV rays from the second UV curing device for the initial irradiation and the first UV curing device for the additional irradiation may be adjusted according to the practical need, so as to improve the curing effect.

Figure 9:
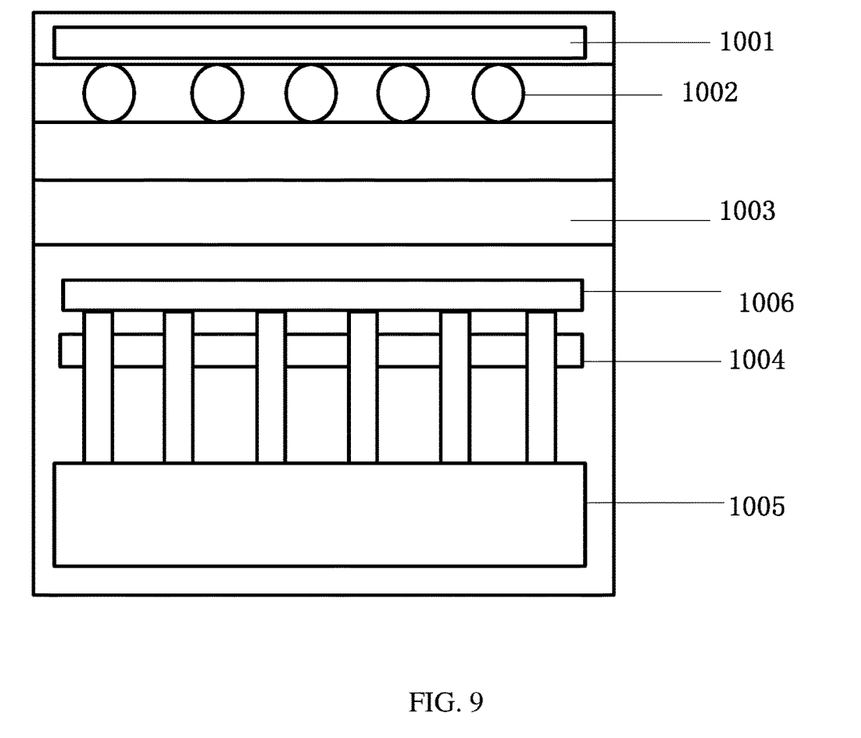
FIG. 9 is a sectional view of a sealant curing system according to one embodiment of the present disclosure.

Referring to FIG. 9, which is a sectional view of the sealant curing system according to one embodiment of the present disclosure, the sealant curing system includes a second reflection plate 1001, a curing module including a UV source 1002 and an optical assembly 1003, and a support table. The support table includes liftable support columns 1004 and a table movement unit 1005. The liftable support columns 1004 are configured to support the to-be-cured display panel 1006, and the table movement unit 1005 is configured to control the liftable support columns 1004 to move upward or downward, or remain immobile. The second reflection plate 1001 is arranged above the curing module, with a reflection surface facing the curing module, so as to improve the utilization rate of the UV rays.

Optionally, the sealant curing system may further include a first reflection plate (not shown in FIG. 9, i.e., the reflection plate 201 in FIGS. 3 and 4) arranged on the support table. The first reflector is arranged between the support table and the to-be-cured display panel, with a reflection surface facing the UV curing device, so as to improve the utilization rate of the UV rays.

Figure 10:
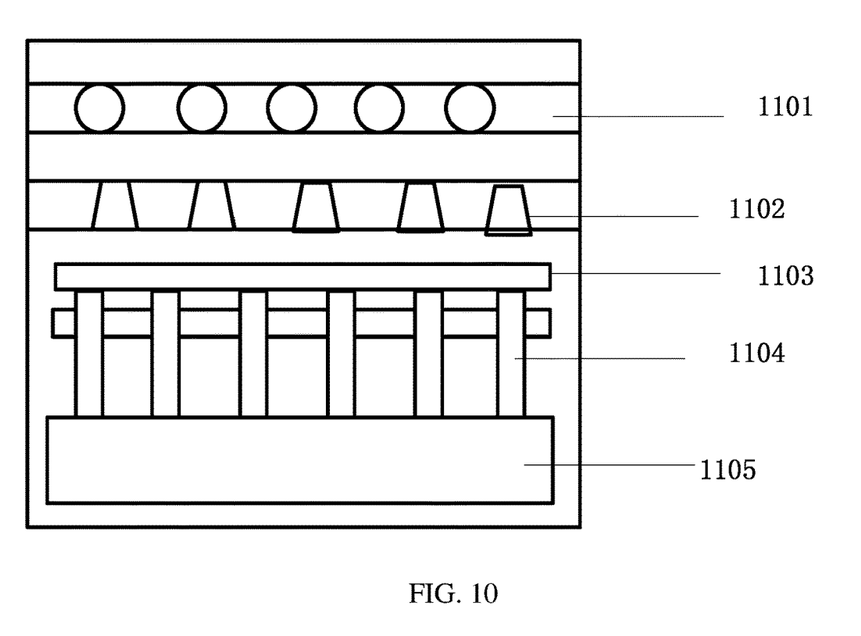
FIG. 10 is a sectional view of a sealant curing system in related art.

In the embodiments of the present disclosure, the curing module may include the UV curing device in FIG. 6. At this point, the UV-diffusion combination transparent plate may be provided, at its bottom, with a vacuum slot, which is connected to a vacuum pipe and a vacuumizing unit and which is configured to adsorb a UV mask plate to be used during the irradiation. As compared with the curing system in the related art (as shown in FIG. 10), it is unnecessary to provide a specific member to adsorb the UV mask plate, thereby to reduce the production cost and save the room. In FIG. 10, 1101 represents the UV source, 1102 represents the member for adsorbing the UV mask plate, 1103 represents the to-be-cured display panel, 1104 represents the liftable support column, and 1105 represents the table movement unit.

The present disclosure further provides in some embodiments a sealant curing method for curing the sealant on the to-be-cured display panel using the above-mentioned sealant curing system, which includes steps of: placing the to-be-cured display panel on the support table; and moving the curing module above the to-be-cured display panel with a mechanical arm or the like, so as to cure the sealant on the to-be-cured display panel.

In the case that the to-be-cured display panel is irradiated by the first UV curing device of the curing module, the method further includes an adjustment step of, in the case that the to-be-cured display panel is irradiated by the first UV curing device, adjusting an emission angle of the UV rays from the UV source of the first UV curing device and/or a position of the optical assembly, so as to enable the optical assembly to output the UV rays at a predetermined angle toward the to-be-cured display panel.

Optionally, the sealant curing system further includes a second UV curing device configured to cure the sealant on the to-be-cured display panel. Prior to the adjustment step, the method further includes controlling the second UV curing device to initially irradiate the sealant on the to-be-cured display panel.

In a specific embodiment of the present disclosure, the method may include the following steps.

Step S11: controlling the UV rays from the curing module.

Step S12: detecting an intensity of the UV rays from the curing module, and determining whether or not the intensity is less than a first predetermined value.

Step S13: in the case that the detected intensity is less than the first predetermined value, adjusting the intensity of the UV rays from the curing module.

Step S14: in the case that the detected intensity is not less than the first predetermined value, irradiating the to-be-cured display panel with the UV rays.

Step S15: accumulating illumination values of the UV rays irradiating the to-be-cured display panel to obtain an accumulated illumination value, and determining whether or not the accumulated illumination value reaches a second predetermined value.

In the embodiment of the present disclosure, the accumulated illumination value may be calculated using the following equation: the accumulated illumination value (mj/cm$^2$)= the intensity (mw/cm$^2$)*an irradiation time (sec)=the intensity (mw/cm$^2$)*[a curing distance (cm)/a speed of the UV source relative to the support table (cm/sec)].

Step S16: in the case that the accumulated illuminated value reaches the second predetermined value, terminating the irradiation at a current position, and otherwise, continuing to irradiate the to-be-cured display panel at the current position.

The curing module may be any one of the above-mentioned first UV curing device and second UV curing device.

Figure 11:
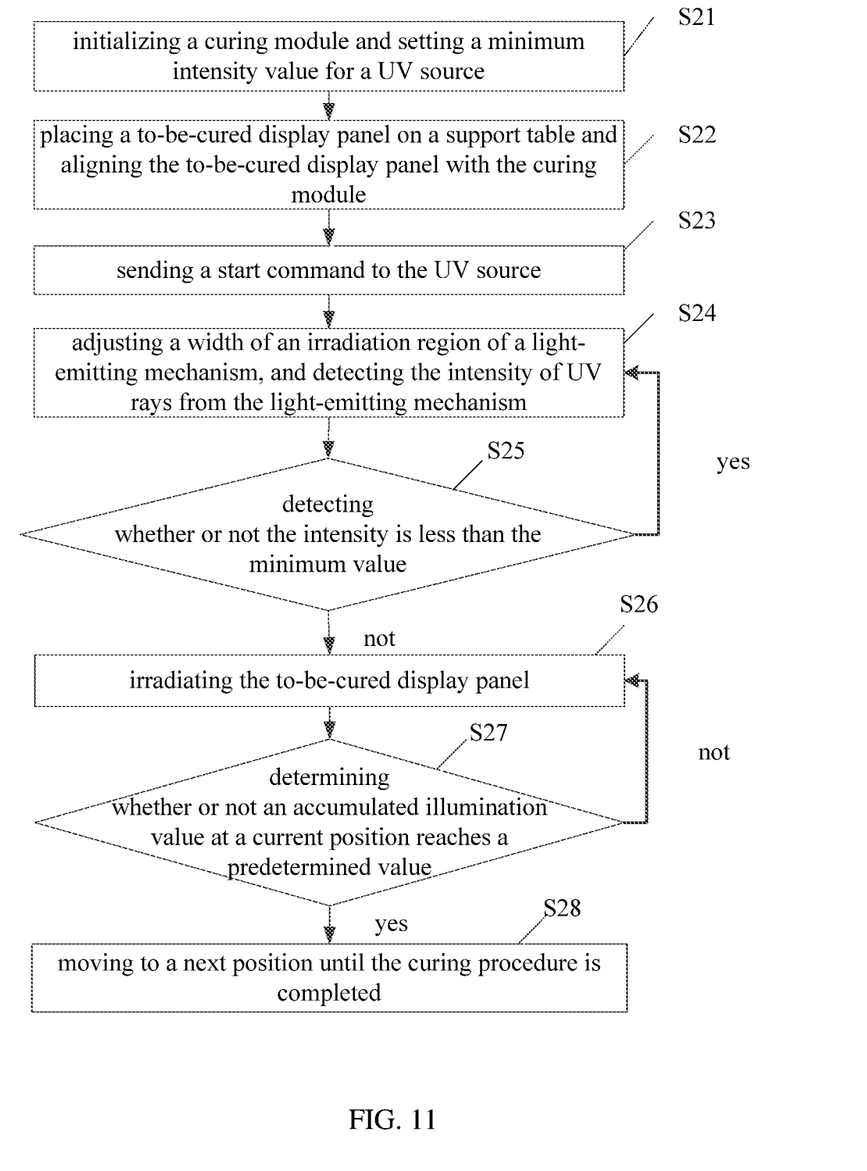
FIG. 11 is a flow chart of a sealant curing method according to one embodiment of the present disclosure.

Referring to FIG. 11, which is a flow chart of the sealant curing method according to one embodiment of the present disclosure, which includes: Step 21 of initializing the curing module and setting a minimum intensity value for the UV source; Step S22 of placing the to-be-cured display panel on the support table and aligning the to-be-cured display panel with the curing module; Step S23 of sending a start command to the UV source; Step S24 of adjusting a width of the irradiation region to be a predetermined value, and detecting the intensity of the UV rays from the light-emitting mechanism; Step S25 of detecting whether or not the intensity is less than the minimum value, in the case of yes, returning back to Step S24, and otherwise processing to Step S26; Step S26 of irradiating the to-be-cured display panel; Step S27 of calculating the accumulated illumination value at the current position, determining whether or not it reaches a predetermined value, in the case of yes, proceeding to Step S28, and otherwise, repeating Step S26; and Step S28 of moving the curing module to a next position until the entire curing procedure is completed.

In the embodiments of the present disclosure, the sealant may have a width at a millimeter scale and a rectangular shape. In some other embodiments of the present disclosure, the sealant may have any common geometrical shape, e.g., a circular or polygonal shape.

The above are merely the preferred embodiments of the present disclosure. Obviously, a person skilled in the art may make further modifications and improvements without departing from the spirit of the present disclosure, and these modifications and improvements shall also fall within the scope of the present disclosure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An ultraviolet (UV) curing device, comprising:
a light-emitting mechanism configured to emit and guide UV rays in an output direction; and
a first adjustment mechanism connected to the light-emitting mechanism and configured to adjust the output direction of the UV rays from the light-emitting mechanism so that the UV rays enter a to-be-cured display panel at an incident angle;
wherein the light-emitting mechanism comprises:
a UV source; and
an optical assembly configured to treat UV rays from the UV source and guide the treated UV rays in the output direction;
wherein the first adjustment mechanism is configured to adjust at least one of an emission angle of the UV rays from the UV source and positions of optical elements in the optical assembly, so as to adjust the output direction of the UV rays from the optical assembly;
the UV source is an extra-high-pressure mercury vapor lamp;
the optical assembly comprises a collecting lens, a first plane mirror, a condensing and reflecting mirror, a second plane mirror, and a UV-diffusion combination transparent plate;
the optical assembly is configured so that UV rays from the extra-high-pressure mercury vapor lamp can be collected by the collecting lens toward the first plane mirror, then reflected by the first plane mirror toward the condenser mirror, then reflected by the condenser mirror toward the second plane mirror, and then reflected by the second plane mirror toward the UV-diffusion combination transparent plate; and
the UV-diffusion combination transparent plate is configured to diffuse the UV rays reflected by the second plane mirror, and output the diffused UV rays in the output direction;
the UV-diffusion combination transparent plate comprises a diffusion plate, a first prism set and a second prism set arranged sequentially, the first prism set comprises a plurality of prisms arranged parallel to each other and extending in a first direction, and the second prism set comprises a plurality of prisms arranged parallel to each other and extending in a second direction perpendicular to the first direction; and
a light-exiting surface of the second prism set is provided with a vacuum slot, which is connected to a vacuum pipe and a vacuumizing unit and which is configured to adsorb a UV mask plate when the vacuum slot is vacuumized.

2. The UV curing device according to claim 1, wherein the UV source is a UV laser;
the optical assembly comprises a scattering sub-assembly and a guiding sub-assembly; and
the scattering sub-assembly is configured to scatter the UV rays from the UV laser, and the scattered UV rays are guided by the guiding sub-assembly.

3. The UV curing device according to claim 2, wherein the scattering sub-assembly comprises a plano-convex collimating lens, and the guiding sub-assembly comprises a plane mirror and a plano-convex focusing lens;
the plano-convex collimating lens is configured to receive the UV rays from the UV laser and output collimated parallel UV rays;
the collimated parallel UV rays are reflected by the plane mirror and enter the plano-convex focusing lens; and
the plano-convex focusing lens is configured to focus the UV rays reflected by the plane mirror and output the focused UV rays.

4. The UV curing device according to claim 3, wherein the UV laser is located at a focus of the plano-convex collimating lens, the plano-convex collimating lens is located between the UV laser and the plane mirror, an optical axis of the plano-convex collimating lens has an angle of 45° relative to a surface of the plane mirror, an optical axis of the plano-convex focusing lens has an angle of 45° relative to the surface of the plane mirror, and the optical axis of the plano-convex collimating lens is perpendicular to the optical axis of the plano-convex focusing lens.

5. The UV curing device according to claim 1, wherein the collecting lens is sleeved onto the extra-high-pressure mercury vapor lamp so as to collect the UV rays from the extra-high-pressure mercury vapor lamp toward the first plane mirror, the first plane mirror is arranged opposite to the condenser mirror, and the second plane mirror is arranged parallel to a surface of the first plane mirror.

6. The UV curing device according to claim 5, wherein the optical assembly further comprises a shutter between the first plane mirror and the condenser mirror.

7. The UV curing device according to claim 6, wherein the optical assembly further comprises a filter between the shutter and the condenser mirror, and configured to filter out rays other than the UV rays.

8. The UV curing device according to claim 1, further comprising an illuminometer on the second plane mirror and configured to measure an intensity of the UV rays from the optical assembly.

9. A sealant curing system, comprising:
a support table configured to support and fix thereon a to-be-cured display panel; and
a curing module arranged above the support table and configured to cure a sealant on the to-be-cured display panel;
wherein the curing module comprises the UV curing device according to claim 1 as a first UV curing device.

10. The sealant curing system according to claim 9, wherein the curing module further comprises:
a second UV curing device configured to cure the sealant on the to-be-cured display panel, a light spot formed by UV rays from the second UV curing device on the to-be-cured display panel having an area larger than a light spot formed by the UV rays from the first UV curing device; and
a control device connected to the first UV curing device and the second UV curing device, and configured to control the second UV curing device to initially irradiate the sealant on the to-be-cured display panel, and after completion of initially irradiating, control the first UV curing device to additionally irradiate the sealant at a position where the sealant is not completely cured on the to-be-cured display panel.

11. The sealant curing system according to claim 10, wherein the second UV curing device comprises:
a UV source;
an optical assembly configured to treat UV rays from the UV source and guide the treated UV rays in an output direction; and
a second adjustment mechanism configured to adjust at least one of an emission angle of the UV rays from the UV source of the second UV curing device and positions of optical elements in the optical assembly, so as to adjust the output direction of the UV rays from the optical assembly.

12. The sealant curing system according to claim 9, further comprising:
a first reflection plate on the support table, with a reflection surface facing the UV curing device.

13. The sealant curing system according to claim 9, further comprising:
a second reflection plate arranged above the curing module, with a reflection surface facing the curing module.

14. A sealant curing method for curing a sealant on a to-be-cured display panel using the sealant curing system according to claim 10, comprising:
an adjustment step of, in the case that the to-be-cured display panel is irradiated by the first UV curing device, adjusting at least one of an emission angle of UV rays from the UV source of the first UV curing device and a position of the optical assembly, so as to enable the optical assembly to output the UV rays at an incident angle toward the to-be-cured display panel.

15. The sealant curing method according to claim 14, wherein the sealant curing system further comprises a second UV curing device configured to cure the sealant on the to-be-cured display panel, and
prior to the adjustment step, the sealant curing method further comprises controlling the second UV curing device to initially irradiate the sealant on the to-be-cured display panel.

16. The sealant curing method according to claim 15, comprising steps of:
controlling UV rays from the curing module;
detecting an intensity of the UV rays from the curing module, and determining whether or not the intensity is less than a first value;
in the case that the detected intensity is less than the first value, adjusting the intensity of the UV rays from the curing module;
in the case that the detected intensity is not less than the first value, irradiating the to-be-cured display panel with the UV rays;
accumulating illumination values of the UV rays irradiating the to-be-cured display panel to obtain an accumulated illumination value, and determining whether or not the accumulated illumination value reaches a second value; and
in the case that the accumulated illuminated value reaches the second value, terminating irradiating at a current position, and otherwise, continuing to irradiate the to-be-cured display panel at the current position.

17. A sealant curing system, comprising:
a support table configured to support and fix thereon a to-be-cured display panel; and
a curing module arranged above the support table and configured to cure a sealant on the to-be-cured display panel, the curing module comprising a first ultraviolet (UV) curing device comprising:

a light-emitting mechanism configured to emit and guide UV rays in an output direction; and a first adjustment mechanism connected to the light-emitting mechanism and configured to adjust the output direction of the UV rays from the light-emitting mechanism so that the UV rays enter a to-be-cured display panel at an incident angle;

a second UV curing device configured to cure the sealant on the to-be-cured display panel, a light spot formed by UV rays from the second UV curing device on the to-be-cured display panel having an area larger than a light spot formed by the UV rays from the first UV curing device; and a control device connected to the first UV curing device and the second UV curing device, and configured to control the second UV curing device to initially irradiate the sealant on the to-be-cured display panel, and after completion of initially irradiating, control the first UV curing device to additionally irradiate the sealant at a position where the sealant is not completely cured on the to-be-cured display panel.

18. The sealant curing system according to claim 17, wherein the second UV curing device comprises:

a UV source;

an optical assembly configured to treat UV rays from the UV source and guide the treated UV rays in an output direction; and a second adjustment mechanism configured to adjust at least one of an emission angle of the UV rays from the UV source of the second UV curing device and positions of optical elements in the optical assembly, so as to adjust the output direction of the UV rays from the optical assembly.

19. The sealant curing system according to claim 17, further comprising:

a first reflection plate on the support table, with a reflection surface facing the UV curing device.

20. The sealant curing system according to claim 17, further comprising:

a second reflection plate arranged above the curing module, with a reflection surface facing the curing module.

* * * * *